(12) United States Patent
Shinozaki et al.

(10) Patent No.: US 12,149,164 B2
(45) Date of Patent: Nov. 19, 2024

(54) CONTROL CIRCUIT AND POWER SUPPLY CIRCUIT OF DC/DC CONVERTER, AND ELECTRONIC EQUIPMENT

(71) Applicant: ROHM Co., LTD., Kyoto (JP)

(72) Inventors: Tomohisa Shinozaki, Kyoto (JP); Shun Fukushima, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 228 days.

(21) Appl. No.: 17/806,517

(22) Filed: Jun. 13, 2022

(65) Prior Publication Data

US 2022/0407409 A1 Dec. 22, 2022

(30) Foreign Application Priority Data

Jun. 16, 2021 (JP) .................. 2021-100347

(51) Int. Cl.
*H02M 1/32* (2007.01)
*H02M 1/088* (2006.01)
*H02M 3/155* (2006.01)

(52) U.S. Cl.
CPC ............ *H02M 1/32* (2013.01); *H02M 1/088* (2013.01); *H02M 3/155* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS 6,841,979 B2 * 1/2005 Berson .............. H02M 1/4258
323/285
8,786,247 B2 * 7/2014 Ishino .................. H01M 10/44
307/151

(Continued)

FOREIGN PATENT DOCUMENTS

JP 2021019500 2/2021

*Primary Examiner* — Jeffrey A Gblende
(74) *Attorney, Agent, or Firm* — CHIP LAW GROUP (57) ABSTRACT

Disclosed herein is a control circuit of a boost DC/DC converter having a high-side transistor and a low-side transistor. The circuit includes an input pin that receives an input voltage of the boost DC/DC converter, a pulse modulator that generates a pulse signal pulse-modulated in such a manner that output of the boost DC/DC converter comes close to a target state, a logic circuit that generates a control signal of the high-side transistor and a control signal of the low-side transistor on the basis of the pulse signal, and a switch driving circuit that drives a load switch that is a PMOS transistor connected to the high-side transistor and a load between them. When stopping the boost DC/DC converter, the switch driving circuit applies a voltage corresponding to the input voltage of the boost DC/DC converter to a gate of the PMOS transistor.

11 Claims, 10 Drawing Sheets

(58) Field of Classification Search
CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 9,231,472 | B2* | 1/2016 | Gong | H05B 45/375 |
| 9,337,735 | B2* | 5/2016 | Odaohhara | G06F 1/26 |
| 9,350,180 | B2* | 5/2016 | Maxwell | H02J 7/0036 |
| 9,685,858 | B2* | 6/2017 | Fukushima | H02M 3/156 |
| 10,879,811 | B2* | 12/2020 | Fukushima | H02M 1/32 |

* cited by examiner

CONTROL CIRCUIT AND POWER SUPPLY CIRCUIT OF DC/DC CONVERTER, AND ELECTRONIC EQUIPMENT

CROSS REFERENCE TO RELATED APPLICATIONS

This application claims priority benefit of Japanese Patent Application No. JP 2021-100347 filed in the Japan Patent Office on Jun. 16, 2021. Each of the above-referenced applications is hereby incorporated herein by reference in its entirety.

BACKGROUND

The present disclosure relates to a direct current/direct current (DC/DC) converter.

A boost DC/DC converter is used to operate a device that requires a voltage higher than a power supply voltage. The boost DC/DC converter is always conductive between an input line and an output line through an inductor and a body diode of a high-side transistor. Therefore, even when the boost DC/DC converter is stopped, a voltage equal to an input voltage occurs on the output line and is supplied to a load.

In a case where it is desired to prevent a voltage from being supplied to the load when the boost DC/DC converter is stopped, a load switch is inserted between the high-side transistor and the output line. Alternatively, instead of the load switch, a high-side switch is inserted between the input line and the inductor in some cases. When the boost DC/DC converter is stopped, the load switch or the high-side switch is turned off, and it is thus possible to prevent a voltage from occurring on the output line.

An example of the related art is disclosed in Japanese Patent Laid-open No. 2020-120473.

SUMMARY

The load switch and the high-side switch are connected in series to the inductor. Therefore, when the load switch or the high-side switch is turned off, there is a possibility that a coil current flowing in the inductor steeply changes and an overvoltage occurs.

The present disclosure has been made in view of the problems, and it is desirable to provide a control circuit capable of safely turning off a load switch and a high-side switch.

An aspect of the present disclosure relates to a control circuit of a boost DC/DC converter having a high-side transistor and a low-side transistor. The control circuit includes an input pin that receives an input voltage of the boost DC/DC converter, a pulse modulator that generates a pulse signal pulse-modulated in such a manner that output of the boost DC/DC converter comes close to a target state, a logic circuit that generates a control signal of the high-side transistor and a control signal of the low-side transistor on the basis of the pulse signal, and a switch driving circuit that drives a load switch that is a P-type metal oxide semiconductor (PMOS) transistor connected to the high-side transistor and a load between them. When stopping the boost DC/DC converter, the switch driving circuit applies a voltage corresponding to the input voltage of the boost DC/DC converter to a gate of the PMOS transistor.

Another aspect of the present disclosure also relates to a control circuit of a boost DC/DC converter having a high-side transistor, a low-side transistor, and an inductor. The control circuit includes an output pin to be connected to an output line of the boost DC/DC converter, a pulse modulator that generates a pulse signal pulse-modulated in such a manner that output of the boost DC/DC converter comes close to a target state, a logic circuit that generates a control signal of the high-side transistor and a control signal of the low-side transistor on the basis of the pulse signal, and a switch driving circuit that drives an N-type metal oxide semiconductor (NMOS) transistor provided as a high-side switch connected to an input node and the inductor of the boost DC/DC converter between them. When stopping the boost DC/DC converter, the switch driving circuit applies a voltage corresponding to an output voltage of the boost DC/DC converter to a gate of the NMOS transistor.

It should be noted that any combination of the above constituent elements or conversion of the expression of the present disclosure between a method, a device, and the like is also effective as an aspect of the present technology.

According to an aspect of the present disclosure, a load switch and a high-side switch can safely be turned off.

DETAILED DESCRIPTION OF THE PREFERRED EMBODIMENTS

Outline of Embodiments

An outline of some exemplary embodiments of the present disclosure will be described. This outline briefly describes some concepts of one or more embodiments for the purpose of basically understanding the embodiments, as a preface of the detailed description to be described later, and does not limit the scope of the technology or the disclosure. This outline is not a comprehensive outline of all the possible embodiments and is not intended to identify important elements of all the embodiments or to draw the line in the range of some or all aspects. For convenience, the term "one embodiment" is used in some cases to indicate an embodiment (an example or a modified example) or a plurality of embodiments (examples or modified examples) disclosed in the specification.

A control circuit according to one embodiment is used in a boost DC/DC converter having a high-side transistor and a low-side transistor. The control circuit includes an input pin that receives an input voltage of the boost DC/DC converter, a pulse modulator that generates a pulse signal pulse-modulated in such a manner that output of the boost DC/DC converter comes close to a target state, a logic circuit that generates a control signal of the high-side transistor and a control signal of the low-side transistor on the basis of the pulse signal, and a switch driving circuit that drives a load switch that is a PMOS transistor connected to the high-side transistor and a load between them. When stopping the boost DC/DC converter, the switch driving circuit applies a voltage corresponding to the input voltage of the boost DC/DC converter to a gate of the PMOS transistor.

According to this configuration, when the boost DC/DC converter is stopped, the PMOS transistor can be operated as a source follower circuit (drain ground circuit) by application of a voltage Vc corresponding to the input voltage to the gate of the PMOS transistor without immediately turning off the load switch (PMOS transistor). At this time, a source voltage of the PMOS transistor, that is, a voltage $V_{MID}$ of a connection node provided between the load switch and the high-side transistor is clamped to $V_{MID}=V_C+V_{GS}\approx V_{IN}+V_{GS}$, and it is possible to prevent an overvoltage from occurring. A voltage $V_{SW}$ of a connection node (switching pin) provided between the high-side transistor and the low-side transistor becomes $V_{SW}=V_{MID}+V_F=Vc+V_{GS}\approx V_{IN}+V_{GS}+V_F$, and the overvoltage of the switching pin is also suppressed. $V_F$ is the forward voltage of a body diode of the high-side transistor. In addition, a voltage $V_L$ between both ends of an inductor at this time becomes $V_L=V_{IN}-V_{SW}=V_{IN}-(V_C+V_{GS}+V_F)\approx-(V_{GS}+V_F)$. Accordingly, it is possible to decrease a coil current with time at an inclination of $-(V_{GS}+V_F)/L$.

In one embodiment, the switch driving circuit may connect the gate of the PMOS transistor to the input pin when stopping the boost DC/DC converter. Accordingly, the input voltage $V_{IN}$ can be applied to the gate of the PMOS transistor.

In one embodiment, the switch driving circuit may apply an ON voltage lower than the source voltage of the PMOS transistor by a predetermined voltage width to the gate of the PMOS transistor in a period where the load switch is to be turned on.

In one embodiment, the control circuit may further include the high-side transistor, the low-side transistor, and the PMOS transistor. The high-side transistor, the low-side transistor, and the PMOS transistor may be external discrete elements.

In one embodiment, it is not necessary to provide a pin at a connection node provided between the high-side transistor and the PMOS transistor. Since the voltage $V_{MID}$ of the connection node provided between the high-side transistor and the PMOS transistor can be clamped by use of the PMOS transistor of the load switch, a circuit element for suppressing the jumping-up of the connection node is not required, and thus a pin for connecting the circuit element to the connection node is not required.

A control circuit according to one embodiment is used in a boost DC/DC converter having a high-side transistor and a low-side transistor. The control circuit includes a pulse modulator that generates a pulse signal pulse-modulated in such a manner that output of the boost DC/DC converter comes close to a target state, a logic circuit that generates a control signal of the high-side transistor and a control signal of the low-side transistor on the basis of the pulse signal, and a switch driving circuit that drives a high-side switch that is an NMOS transistor connected to an input node of the boost DC/DC converter and an inductor between them. When stopping the boost DC/DC converter, the switch driving circuit applies a voltage corresponding to an output voltage of the boost DC/DC converter to a gate of the NMOS transistor.

According to this configuration, when the boost DC/DC converter is stopped, the NMOS transistor can be operated as a source follower circuit (drain ground circuit) by application of a voltage Vd corresponding to the output voltage to the gate of the NMOS transistor without immediately turning off the high-side switch (NMOS transistor). At this time, the voltage $V_{MID}$ of a connection node provided between the high-side switch and the inductor is clamped to $V_{MID}=Vd-V_{GS}\approx V_{OUT}-V_{GS}$, and it is possible to prevent an overvoltage from occurring. The voltage $V_{SW}$ of the connection node (switching pin) provided between the high-side transistor and the low-side transistor becomes $V_{SW}=V_{OUT}+V_F$. $V_F$ is the forward voltage of a body diode of a high-side transistor M2. In addition, the voltage $V_L$ between both ends of the inductor at this time becomes $V_L=V_{MID}-V_{SW}=(Vd-V_{GS})-(V_{OUT}+V_F)\approx-(V_{GS}+V_F)$. Accordingly, it is possible to decrease the coil current with time at an inclination of $-(V_{GS}+V_F)/L$.

In one embodiment, the switch driving circuit may connect the gate of the NMOS transistor to an output pin when stopping the boost DC/DC converter. Accordingly, an output voltage $V_{OUT}$ can be applied to the gate of the NMOS transistor.

In one embodiment, the switch driving circuit may apply an ON voltage higher than a source voltage of the NMOS transistor by a predetermined voltage width to the gate of the NMOS transistor in a period where the high-side switch is to be turned on.

In one embodiment, the control circuit may further include the high-side transistor, the low-side transistor, and the NMOS transistor. The high-side transistor, the low-side transistor, and the NMOS transistor may be external discrete elements.

In one embodiment, it is not necessary to connect a diode to the connection node and the ground between them, the connection node being provided between the inductor and the high-side switch. Accordingly, the number of parts of the DC/DC converter can be reduced.

In one embodiment, the control circuit may be integrated into one semiconductor substrate. The "integration" includes a case where all of the constituent elements of the circuit are formed on the semiconductor substrate and a case where the main constituent elements of the circuit are integrated, and some resistors, capacitors, and the like may be provided outside the semiconductor substrate to adjust the circuit constant. By integrating the circuit on one chip, the circuit area can be reduced and the characteristics of the circuit elements can be kept uniform.

Embodiments

Hereinafter, the present disclosure will be described with reference to the drawings on the basis of preferred embodiments. The same or equivalent constituent elements, members, and processes illustrated in each drawing are denoted by the same reference signs, and duplicate descriptions are appropriately omitted. In addition, the embodiments are illustrative and do not limit the disclosure, and all the features or combinations thereof to be described in the embodiments are not necessarily essential to the disclosure.

In the specification, "a state where a member A is connected to a member B" includes not only a case where the member A and the member B are physically and directly connected to each other, but also a case where the member A and the member B are indirectly connected to each other through other members that do not substantially affect the electrical connection state of the members A and B or impair the function or effect provided by the coupling of the members A and B.

Similarly to the above, "a state where a member C is provided between a member A and a member B" includes not only a case where the member A and the member C or the member B and the member C are directly connected to each other, but also a case where the member A and the member C or the member B and the member C are indirectly connected to each other through other members that do not substantially affect the electrical connection state of the members A and C or the members B and C or impair the function or effect provided by the coupling of the members A and C or the members B and C.

In addition, "a signal A (voltage and current) corresponds to a signal B (voltage and current)" means that the signal A is correlated with the signal B, and specifically means (i) a case where the signal A is the signal B, (ii) a case where the signal A is proportional to the signal B, (iii) a case where the signal A is obtained by level-shifting the signal B, (iv) a case where the signal A is obtained by amplifying the signal B, (v) a case where the signal A is obtained by inverting the signal B, (vi) any combination thereof, and the like. It will be understood by those skilled in the art that the range of the "corresponding" will be defined according to the types and applications of the signals A and B.

The vertical axis and the horizontal axis of the waveform diagrams and time charts to be referred to in the specification are appropriately enlarged or reduced to facilitate understanding, and each waveform to be illustrated is also simplified or exaggerated or emphasized to facilitate understanding.

First Embodiment

Figure 1:
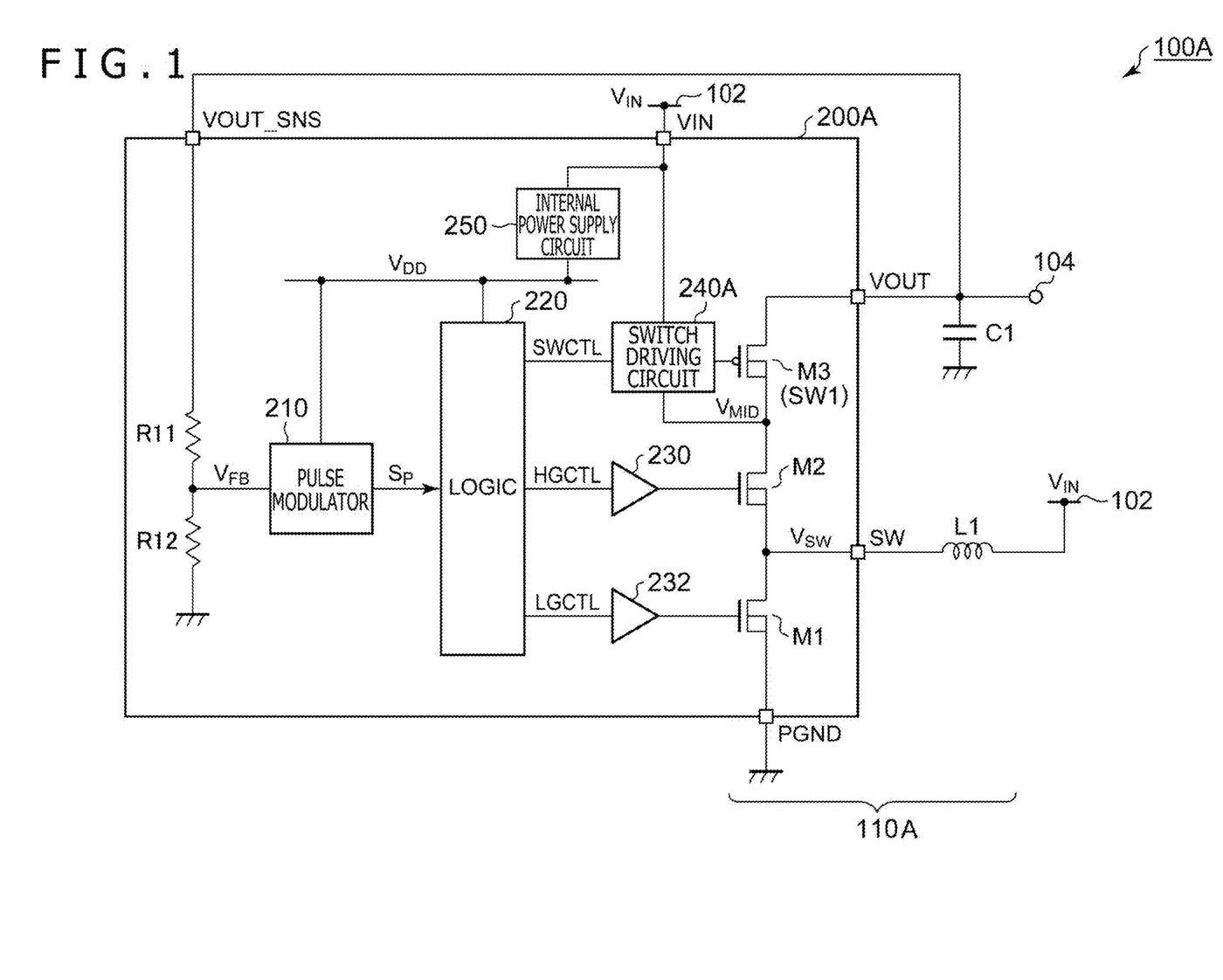
FIG. 1 is a circuit diagram of a boost DC/DC converter according to a first embodiment.

FIG. 1 is a circuit diagram of a boost DC/DC converter 100A according to a first embodiment. The boost DC/DC converter (hereinafter, simply referred to as a DC/DC converter) 100A boosts an input voltage $V_{IN}$ of an input terminal (input line) 102, stabilizes the voltage to a predetermined voltage level, and supplies the same to a load (not illustrated) connected to an output terminal (output line) 104.

The DC/DC converter 100A includes a main circuit 110A and a control circuit 200A. The main circuit 110A includes an inductor L1, a low-side transistor (switching transistor) M1, a high-side transistor (synchronous rectifier transistor) M2, an output capacitor C1, and a load switch SW1.

The control circuit 200A is a functional integrated circuit (IC) integrated into one semiconductor substrate (die). In the present embodiment, the low-side transistor M1, the high-side transistor M2, and a PMOS transistor M3 are integrated into the control circuit 200A. The PMOS transistor M3 is provided as a load switch SW1.

The control circuit 200A includes, in addition to the low-side transistor M1, the high-side transistor M2, and the PMOS transistor M3, a pulse modulator 210, a logic circuit 220, a high-side driver 230, a low-side driver 232, a switch driving circuit 240A, and resistors R11 and R12.

The control circuit 200A is provided with a switching pin SW, a ground pin PGND, an input pin VIN, an output pin VOUT, and a sense pin VOUT_SNS.

An external inductor L1 is connected to the switching pin SW. An output capacitor C1 is connected to the output pin VOUT. The low-side transistor M1 is connected to the switching pin SW and the ground pin PGND between them. The high-side transistor M2 and the PMOS transistor M3 are directly connected to the switching pin SW and the output pin VOUT between them. The input voltage $V_{IN}$ of the DC/DC converter 100A is supplied to the input pin VIN.

The pulse modulator 210 generates a pulse signal Sp pulse-modulated in such a manner that output of the DC/DC converter 100A comes close to a target state. The output of the DC/DC converter 100A may be an output voltage $V_{OUT}$ (constant voltage output), an output current $I_{OUT}$ (constant current output), or a voltage of a node in a load (not illustrated).

In the present embodiment, the DC/DC converter 100A outputs a constant voltage and stabilizes the output voltage $V_{OUT}$ to the target level $V_{OUT(REF)}$ thereof. The output voltage $V_{OUT}$ is fed back to the sense pin VOUT_SNS. The output voltage $V_{OUT}$ is divided by the resistors R11 and R12, and a feedback signal $V_{FB}$ indicating the output voltage $V_{OUT}$ is generated. The pulse modulator 210 modulates the pulse signal Sp in such a manner that the feedback signal $V_{FB}$ comes close to a reference voltage $V_{REF}$. The target level $V_{OUT(REF)}$ of the output voltage $V_{OUT}$ is expressed by the following equation.

$$V_{OUT(REF)} = V_{REF} \times (R11+R12)/R12$$

The configuration and control method of the pulse modulator 210 are not particularly limited. For example, the pulse modulator 210 may be a voltage mode controller, a peak current mode controller, or an average current mode controller. Alternatively, the pulse modulator 210 may be a controller for ripple control, specifically, hysteresis control (Bang-Bang control), bottom detection on-time fixing control, or peak detection off-time fixing control.

In addition, the modulation method of the pulse modulator 210 is not particularly limited, and may be pulse width modulation, pulse frequency modulation, or other modulation methods.

The logic circuit 220 generates a control signal HGCTL of the high-side transistor M2 and a control signal LGCTL of the low-side transistor M1 on the basis of the pulse signal Sp. In addition, the logic circuit 220 generates a control signal SWCTL of the PMOS transistor M3.

The high-side driver 230 drives the high-side transistor M2 on the basis of the control signal HGCTL. The low-side driver 232 drives the low-side transistor M1 on the basis of the control signal LGCTL.

The switch driving circuit 240A drives the PMOS transistor M3 that is the load switch SW1, on the basis of the control signal SWCTL.

The switch driving circuit 240A is connected to the input pin VIN and supplied with the input voltage $V_{IN}$. When stopping the DC/DC converter 100A, in other words, when the control signal SWCTL transits to the OFF level (for example, LOW), the switch driving circuit 240A applies the voltage Vc corresponding to the input voltage $V_{IN}$ of the DC/DC converter 100A to a gate of the PMOS transistor M3.

The expression "the voltage Vc corresponds to the input voltage $V_{IN}$" includes a case where the voltage Vc is generated using the input voltage $V_{IN}$. This includes not only a case where the voltage Vc is equal to the input voltage $V_{IN}$, but also a case where the voltage Vc is a voltage obtained after the input voltage $V_{IN}$ is level-shifted in a positive or negative direction, and a case where the voltage Vc is a voltage obtained by multiplying the input voltage $V_{IN}$ by a coefficient. In the present embodiment, the voltage Vc is assumed to be equal to the input voltage $V_{IN}$.

The switch driving circuit 240A applies an ON voltage $V_{ON}$ to the gate of the PMOS transistor M3 in a period where the load switch SW1 is to be turned on (the control signal SWCTL is at the ON level, for example, HIGH). The voltage level of the ON voltage $V_{ON}$ is set in such a manner that the load switch SW1 is surely turned on. For example, the ON voltage $V_{ON}$ is set lower than a source voltage $V_{MID}$ of the PMOS transistor M3 by a predetermined voltage width ΔV. The predetermined voltage width ΔV is larger than a threshold voltage $Vgs_{(th)}$ of the PMOS transistor M3.

An internal power supply circuit 250 generates a power supply voltage $V_{DD}$ to be supplied to the pulse modulator 210 and the logic circuit 220, on the basis of the input voltage $V_{IN}$. It should be noted that, in a case where the power supply voltage $V_{DD}$ is supplied from the outside, the internal power supply circuit 250 may be omitted.

The above is the configuration of the DC/DC converter 100A. Next, the operation thereof will be described. During the operation of the DC/DC converter 100A, the switch driving circuit 240A applies the ON voltage $V_{ON}$ to the gate of the PMOS transistor M3. Accordingly, the PMOS transistor M3, that is, the load switch SW1 is fixed to ON.

Figure 2:
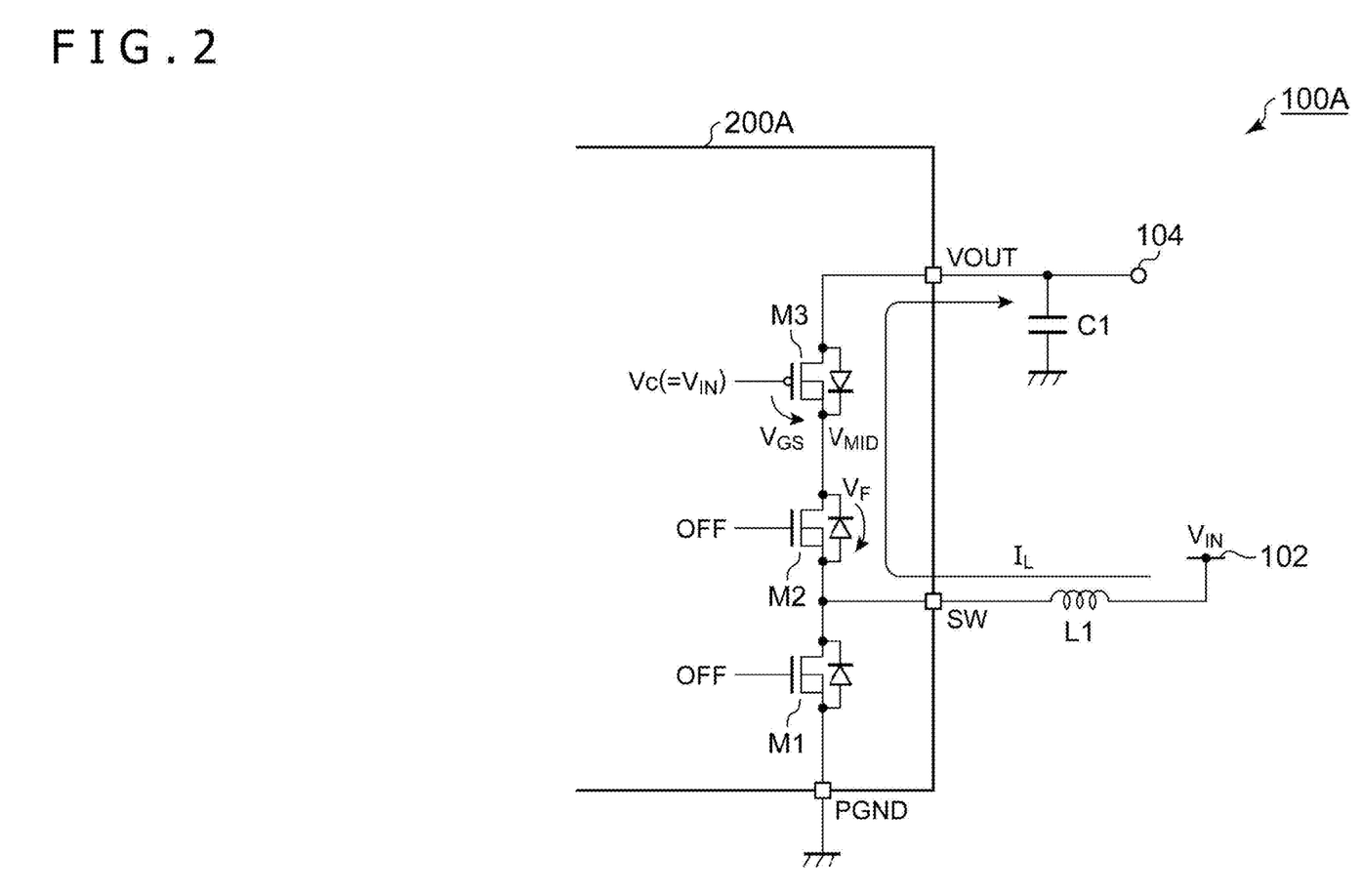
FIG. 2 is an equivalent circuit diagram of the DC/DC converter immediately after a switch control signal SWC-TRL transits to LOW.

When an event of output stop of the DC/DC converter 100A occurs, the logic circuit 220 sets the switch control signal SWCTL to be low. FIG. 2 is an equivalent circuit diagram of the DC/DC converter 100A immediately after the switch control signal SWCTRL transits to LOW.

The switch driving circuit 240A applies the voltage Vc having the same voltage level as the input voltage $V_{IN}$ to the gate of the PMOS transistor M3. At this time, the PMOS transistor M3 is not immediately turned off, but operates as a source follower circuit. As a result, the source voltage of the PMOS transistor M3, that is, a voltage $V_{MID}$ of a connection node provided between the load switch SW1 and the high-side transistor M2 is clamped to $V_{MID}=V_C+V_{GS}$, and it is possible to prevent an overvoltage from occurring.

At this time, a voltage $V_{SW}$ of the switching pin SW that is the connection node provided between the high-side transistor M2 and the low-side transistor M1 becomes $V_{SW}=V_{MID}+V_F=V_C+V_{GS}+V_F \approx V_{IN}+V_{GS}+V_F$, and the overvoltage of the switching pin SW is also suppressed.

In addition, a voltage VL between both ends of the inductor at this time becomes $V_L=V_{IN}-V_{SW}=V_{IN}-(V_c+V_{GS}+V_F)$. As described above, when $Vc \approx V_{IN}$ is set, $V_L \approx -(V_{GS}+V_F)$ is satisfied. Accordingly, a coil current $I_L$ can be decreased with time at an inclination of $-(V_{GS}+V_F)/L$. Thereafter, the coil current $I_L$ becomes zero.

Figure 3:
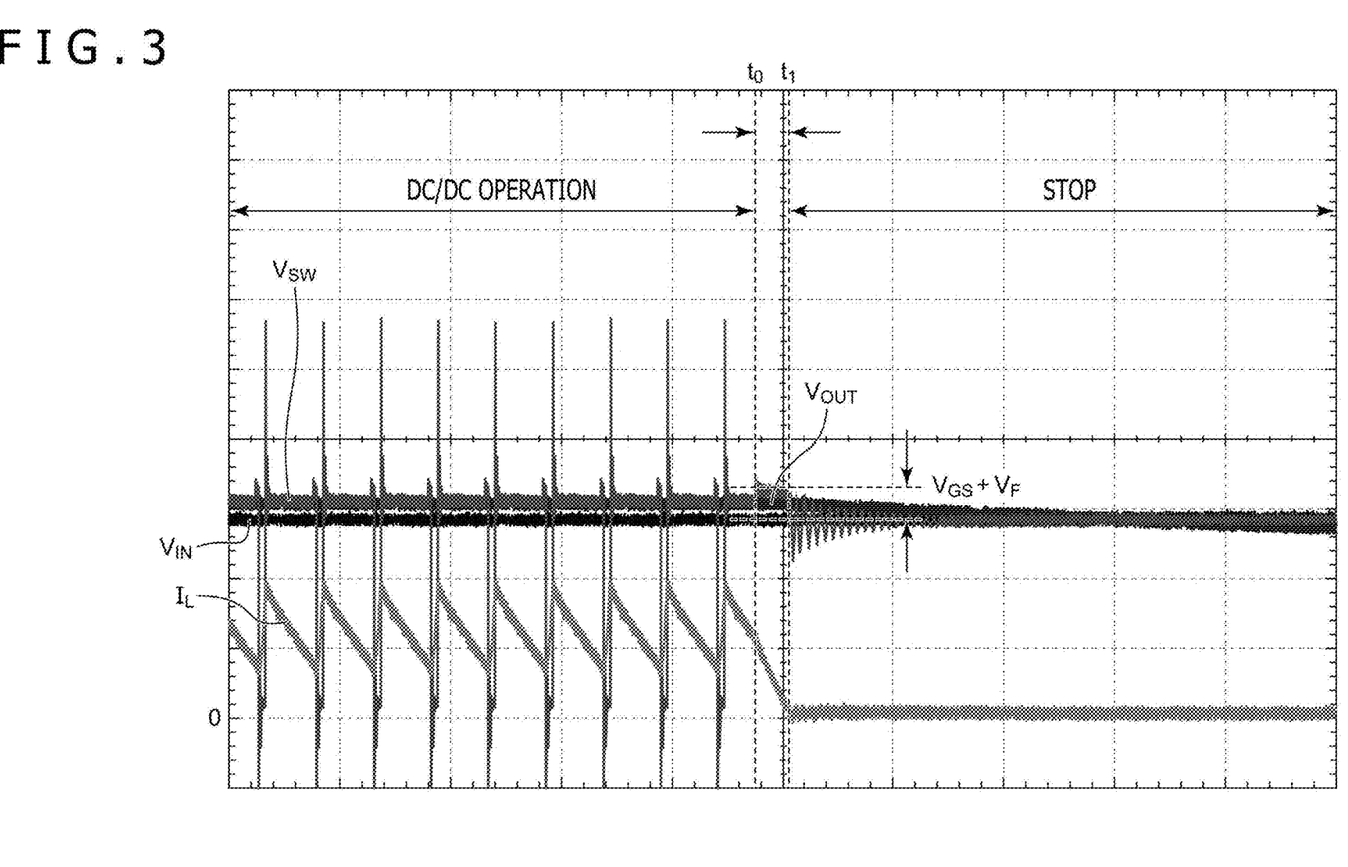
FIG. 3 is a waveform diagram (actual measurement) of the DC/DC converter of FIG. 1.

FIG. 3 is a waveform diagram (actual measurement) of the DC/DC converter 100A of FIG. 1. FIG. 3 illustrates the voltages $V_{SW}$, $V_{IN}$, and $V_{OUT}$ of the switching pin SW, the input pin VIN, and the output pin VOUT, respectively, and the coil current $I_L$. Before the time $t_0$, the DC/DC converter 100A is in a switching operation, and the output voltage $V_{OUT}$ is stabilized to the target level $V_{OUT\ (REF)}$.

When an event as a trigger of stop is detected at the time $t_0$, gate voltages $V_{HG}$ and $V_{LG}$ of the low-side transistor M1 and the high-side transistor M2 become the LOW level, and the voltage $Vc=V_{IN}$ is applied to the gate of the PMOS transistor M3. As a result, the switching voltage $V_{SW}$ is clamped to $V_{IN}+V_{GS}+V_F$. In this section, the coil current $I_L$ is decreased at an inclination (A/s) of $-(V_{GS}+V_F)/L$ and becomes zero at the time $t_1$. After the time $t_1$, the output of the DC/DC converter 100A stops.

Figure 4:
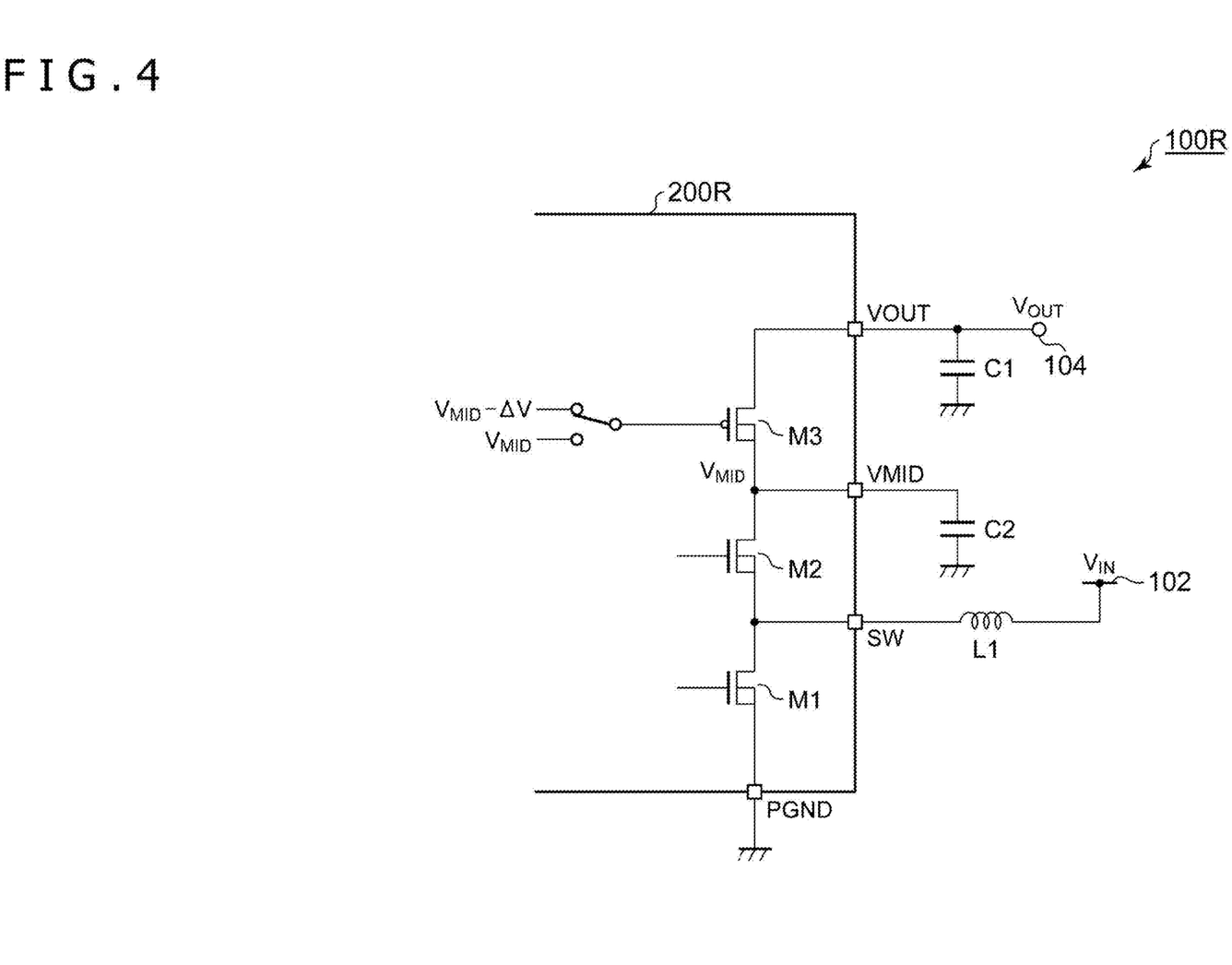
FIG. 4 is a circuit diagram of a DC/DC converter according to a comparative technique 1.

The above is the operation of the DC/DC converter 100A. The advantages of the DC/DC converter 100A are clarified by comparison with a comparative technique 1. FIG. 4 is a circuit diagram of a DC/DC converter 100R according to the comparative technique 1. The voltage applied to the gate of the PMOS transistor M3 when the DC/DC converter 100R is stopped is different between the comparative technique 1 and the first embodiment. In the comparative technique 1, in order to immediately turn off the PMOS transistor M3, the same voltage as the source voltage $V_{MID}$ is applied to the gate in such a manner that the voltage between the gate and the source of the PMOS transistor M3 becomes zero.

In the comparative technique 1, since the PMOS transistor M3 is instantaneously turned off, the path of the coil current $I_L$ is cut off. The coil current $I_L$ continues to flow toward the source of the PMOS transistor M3. There is a risk that the source voltage $V_{MID}$ is raised to cause an overvoltage state. When the source voltage $V_{MID}$ is raised, the switching voltage $V_{SW}$ may also be in an overvoltage state. In order to suppress the overvoltage, it is necessary to take such a countermeasure as providing a pin VMID at the source of the PMOS transistor M3 and connecting a capacitor C2 to the pin VMID.

In contrast, according to the first embodiment, since the source voltage $V_{MID}$ of the PMOS transistor M3 is clamped, an overvoltage is difficult to occur, and reliability is improved.

Further, since the overvoltage of the source voltage of the PMOS transistor M3 is suppressed in the first embodiment, it is not necessary to take a countermeasure for suppressing the overvoltage. That is, it is not necessary to provide the pin VMID at the source of the PMOS transistor M3 to connect the capacitor C2 to the pin VMID. This is advantageous as compared with the comparative technique 1 in terms of cost.

Next, a concrete configuration example of the control circuit 200A will be described.

Figure 5:
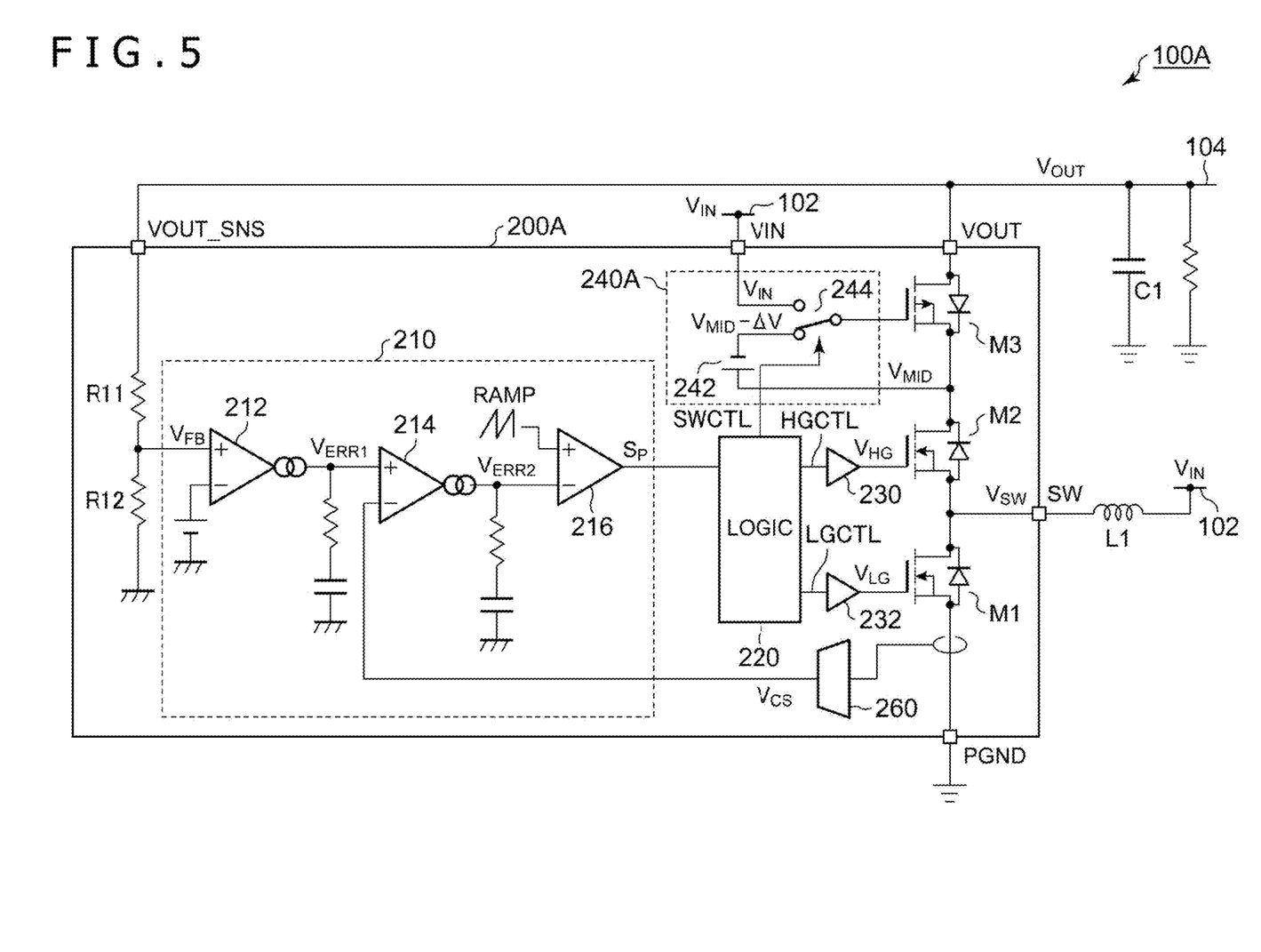
FIG. 5 is a circuit diagram of an example of a control circuit of the DC/DC converter.

FIG. 5 is a circuit diagram of an example of the control circuit 200A of the DC/DC converter. The pulse modulator 210 is a current mode pulse width modulator. A current detection circuit 260 generates a current detection signal $V_{CS}$ indicating the coil current $I_L$ (current flowing in the low-side transistor M1).

The pulse modulator 210 generates the pulse signal Sp on the basis of the feedback signal $V_{FB}$ and the current detection signal $V_{CS}$.

The pulse modulator 210 includes a first error amplifier 212, a second error amplifier 214, and a pulse width modulation (PWM) comparator 216. The first error amplifier 212 amplifies an error occurred between the feedback signal $V_{FB}$ and the reference voltage $V_{REF}$. An output signal $V_{ERR1}$ of the first error amplifier 212 becomes the target value (current command signal) of the current detection signal $V_{CS}$. The second error amplifier 214 amplifies an error occurred between the current command signal $V_{ERR1}$ and the current detection signal $V_{CS}$. The PWM comparator 216 compares an output signal $V_{ERR2}$ of the second error amplifier 214 with a periodic signal RAMP having a ramp wave or a sawtooth wave, to generate the pulse signal Sp.

The switch driving circuit 240A includes a voltage source 242 and a selector 244. The voltage source 242 level-shifts the source voltage $V_{MID}$ of the PMOS transistor M3 to generate a voltage ($V_{MID}-\Delta V$) lower than the source voltage $V_{MID}$ by a predetermined voltage width ΔV. The selector 244 selects one of the input voltage $V_{IN}$ (=Vc) and $V_{MID}-\Delta V$ according to the switch control signal SWCTL, and supplies the selected one to the gate of the PMOS transistor M3. Specifically, the selector 244 connects the gate of the PMOS transistor M3 to the input pin VIN when the switch control signal SWCTL is at the OFF level.

Second Embodiment

Figure 6:
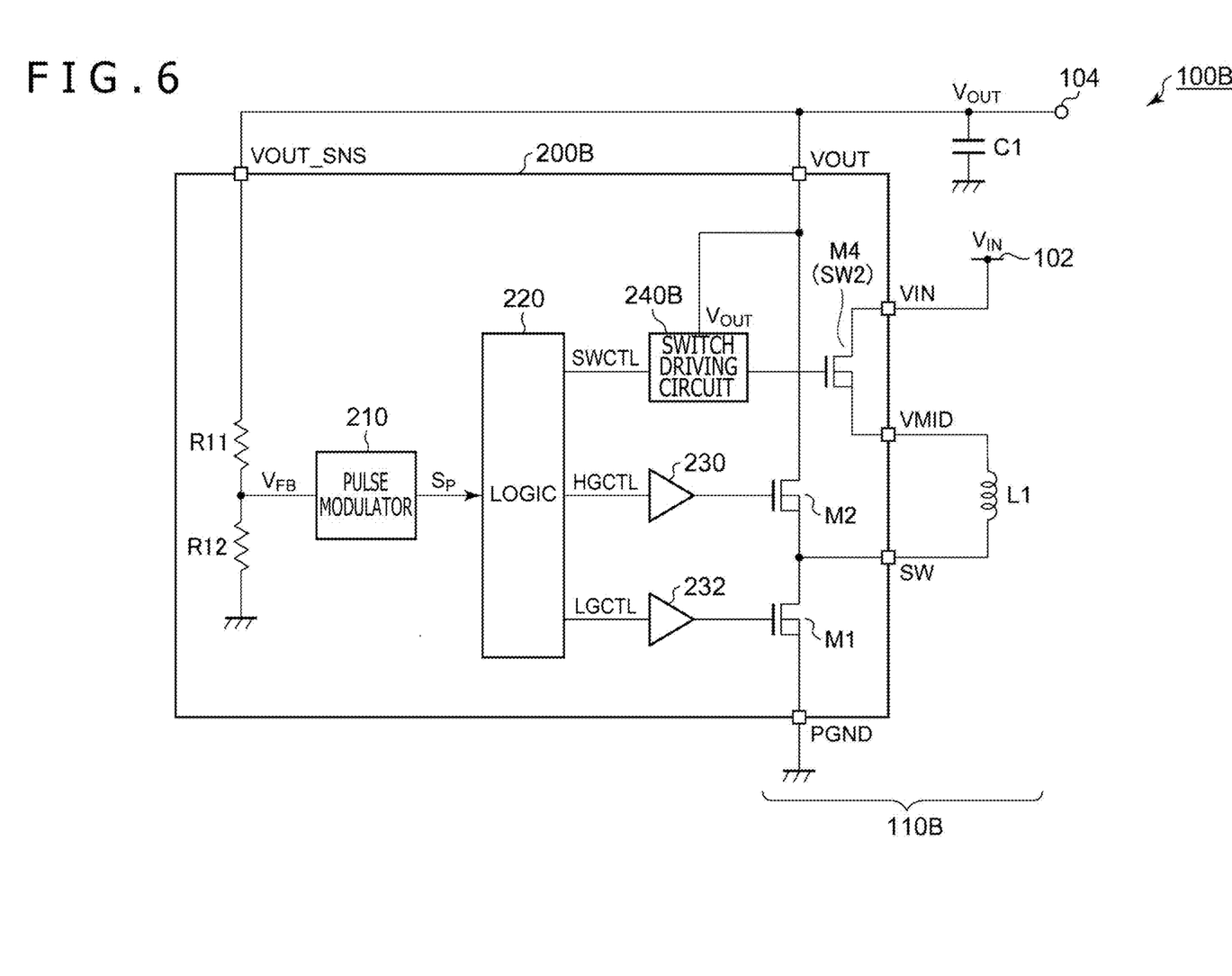
FIG. 6 is a circuit diagram of a boost DC/DC converter according to a second embodiment.

FIG. 6 is a circuit diagram of a boost DC/DC converter 100B according to a second embodiment. The boost DC/DC converter (hereinafter, simply referred to as a DC/DC converter) 100B boosts an input voltage $V_{IN}$ of an input terminal (input line) 102, stabilizes the voltage to a predetermined voltage level, and supplies the same to a load (not illustrated) connected to an output terminal (output line) 104.

The DC/DC converter 100B includes a main circuit 110B and a control circuit 200B. The main circuit 110B includes an inductor L1, a low-side transistor (switching transistor) M1, a high-side transistor (synchronous rectifier transistor) M2, an output capacitor C1, and a high-side switch SW2.

The control circuit 200B is a functional IC integrated into one semiconductor substrate (die). In the present embodiment, the low-side transistor M1, the high-side transistor M2, and an NMOS transistor M4 are integrated into the control circuit 200A. The NMOS transistor M4 is provided as the high-side switch SW2.

The control circuit 200B includes, in addition to the low-side transistor M1, the high-side transistor M2, and the NMOS transistor M4, a pulse modulator 210, a logic circuit 220, a high-side driver 230, a low-side driver 232, a switch driving circuit 240B, and resistors R11 and R12.

The control circuit 200B is provided with a switching pin SW, a ground pin PGND, an input pin VIN, an output pin VOUT, a sense pin VOUT_SNS, and an intermediate pin VMID.

An external inductor L1 is connected to the intermediate pin VMID and the switching pin SW. An output capacitor C1 is connected to the output pin VOUT. The low-side transistor M1 is connected to the switching pin SW and the ground pin PGND between them. The high-side transistor M2 is directly connected to the switching pin SW and the output pin VOUT between them. The NMOS transistor M4 is provided between the input pin VIN and the intermediate pin VMID.

The pulse modulator 210 generates a pulse signal Sp pulse-modulated in such a manner that output of the DC/DC converter 100B comes close to a target state. As described in the first embodiment, the output of the DC/DC converter 100B may be an output voltage $V_{OUT}$ (constant voltage output), an output current $I_{OUT}$ (constant current output), or a voltage of a node in a load (not illustrated).

In the present embodiment, the DC/DC converter 100B outputs a constant voltage and stabilizes the output voltage $V_{OUT}$ to the target level $V_{OUT\ (REF)}$ thereof. The output voltage $V_{OUT}$ is fed back to a sense pin VOUT_SNS. The output voltage $V_{OUT}$ is divided by the resistors R11 and R12, and a feedback signal $V_{FB}$ indicating the output voltage $V_{OUT}$ is generated. The pulse modulator 210 modulates the pulse signal Sp in such a manner that the feedback signal $V_{FB}$ comes close to a reference voltage $V_{REF}$. As described in the first embodiment, the configuration and control method of the pulse modulator 210 are not particularly limited.

The logic circuit 220 generates a control signal HGCTL of the high-side transistor M2 and a control signal LGCTL of the low-side transistor M1 on the basis of the pulse modulator 210. In addition, the logic circuit 220 generates a control signal SWCTL of the NMOS transistor M4.

The high-side driver 230 drives the high-side transistor M2 on the basis of the control signal HGCTL. The low-side driver 232 drives the low-side transistor M1 on the basis of the control signal LGCTL.

The switch driving circuit 240B drives the NMOS transistor M4 on the basis of the control signal SWCTL.

The switch driving circuit 240B is connected to the output pin $V_{OUT}$ and supplied with the output voltage $V_{OUT}$. When stopping the DC/DC converter 100B, in other words, when the control signal SWCTL transits to the OFF level (for example, LOW), the switch driving circuit 240B applies a voltage Vd corresponding to the output voltage $V_{OUT}$ of the DC/DC converter 100B to a gate of the NMOS transistor M4.

The expression "the voltage Vd corresponds to the output voltage $V_{out}$" includes a case where the voltage Vd is generated using the output voltage $V_{OUT}$. This includes not only a case where the voltage Vd is equal to the output voltage $V_{OUT}$, but also a case where the voltage Vd is a voltage obtained after the output voltage $V_{OUT}$ is level-shifted in a positive or negative direction, and a case where the voltage Vd is a voltage obtained by multiplying the output voltage $V_{OUT}$ by a coefficient. In the present embodiment, the voltage Vd is assumed to be equal to the output voltage $V_{OUT}$.

The switch driving circuit 240B applies an ON voltage $V_{ON}$ to the gate of the NMOS transistor M4 in a period where the high-side switch SW2 is to be turned on (the control signal SWCTL is at the ON level, for example, HIGH). The voltage level of the ON voltage $V_{ON}$ is set in such a manner that the high-side switch SW2 is surely turned on. For example, the ON voltage $V_{ON}$ is set higher than a source voltage $V_{MID}$ of the NMOS transistor M4 by a predetermined voltage width ΔV. The predetermined voltage width ΔV is larger than a threshold voltage $Vgs_{(th)}$ of the NMOS transistor M4.

The above is the configuration of the DC/DC converter 100B. Next, the operation thereof will be described. During the operation of the DC/DC converter 100B, the switch driving circuit 240B applies the ON voltage $V_{ON}$ to the gate of the NMOS transistor M4. Accordingly, the NMOS transistor M4, that is, the high-side switch SW2 is fixed to ON.

Figure 7:
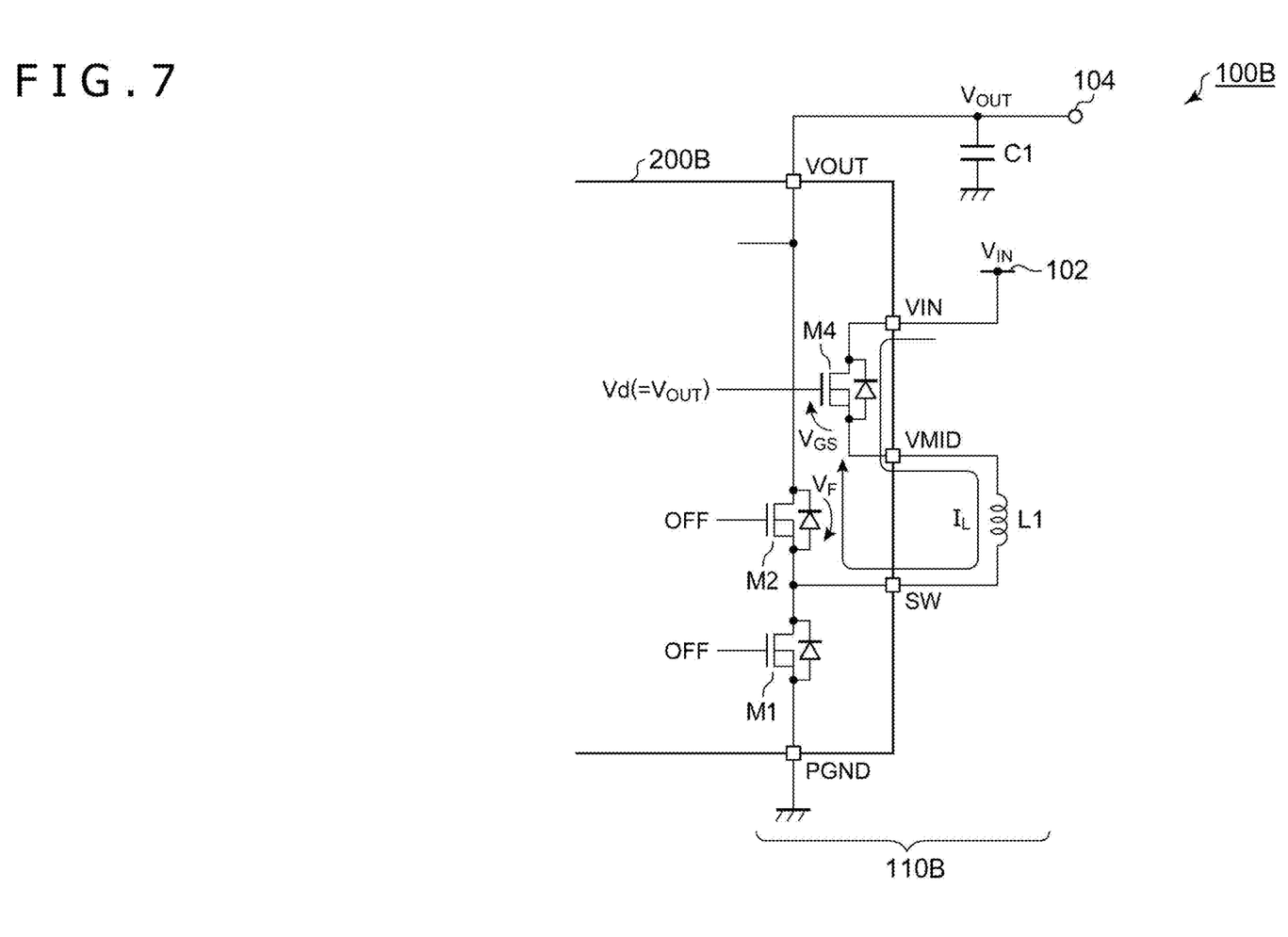
FIG. 7 is an equivalent circuit diagram of the DC/DC converter immediately after a switch control signal SWC-TRL transits to LOW.

When an event of output stop of the DC/DC converter 100B occurs, the logic circuit 220 sets the switch control signal SWCTL to be low. FIG. 7 is an equivalent circuit diagram of the DC/DC converter 100B immediately after the switch control signal SWCTRL transits to LOW.

The switch driving circuit 240B applies the voltage Vd having the same voltage level as the output voltage $V_{OUT}$ to the gate of the NMOS transistor M4. At this time, the NMOS transistor M4 is not immediately turned off, but operates as a source follower circuit. As a result, the source voltage WU) of the NMOS transistor M4 is clamped to $V_{MID}=Vd-V_{GS}$, and does not become a negative voltage. Accordingly, it is possible to prevent an overvoltage from being applied between a drain and a source of the NMOS transistor M4.

In addition, a voltage $V_{SW}$ of a connection node (switching pin) provided between the high-side transistor and the low-side transistor becomes $V_{SW}=V_{OUT}+V_F$. $V_F$ is the forward voltage of a body diode of the high-side transistor M2. The voltage $V_L$ between both ends of the inductor at this time becomes $V_L=V_{MID}-V_{SW}=(Vd-V_{GS})-(V_{OUT}+V_F)≈-(V_{GS}+V_F)$. Accordingly, a coil current $I_L$ can be decreased with time at an inclination of $-(V_{GS}+V_F)/L$.

Figure 8:
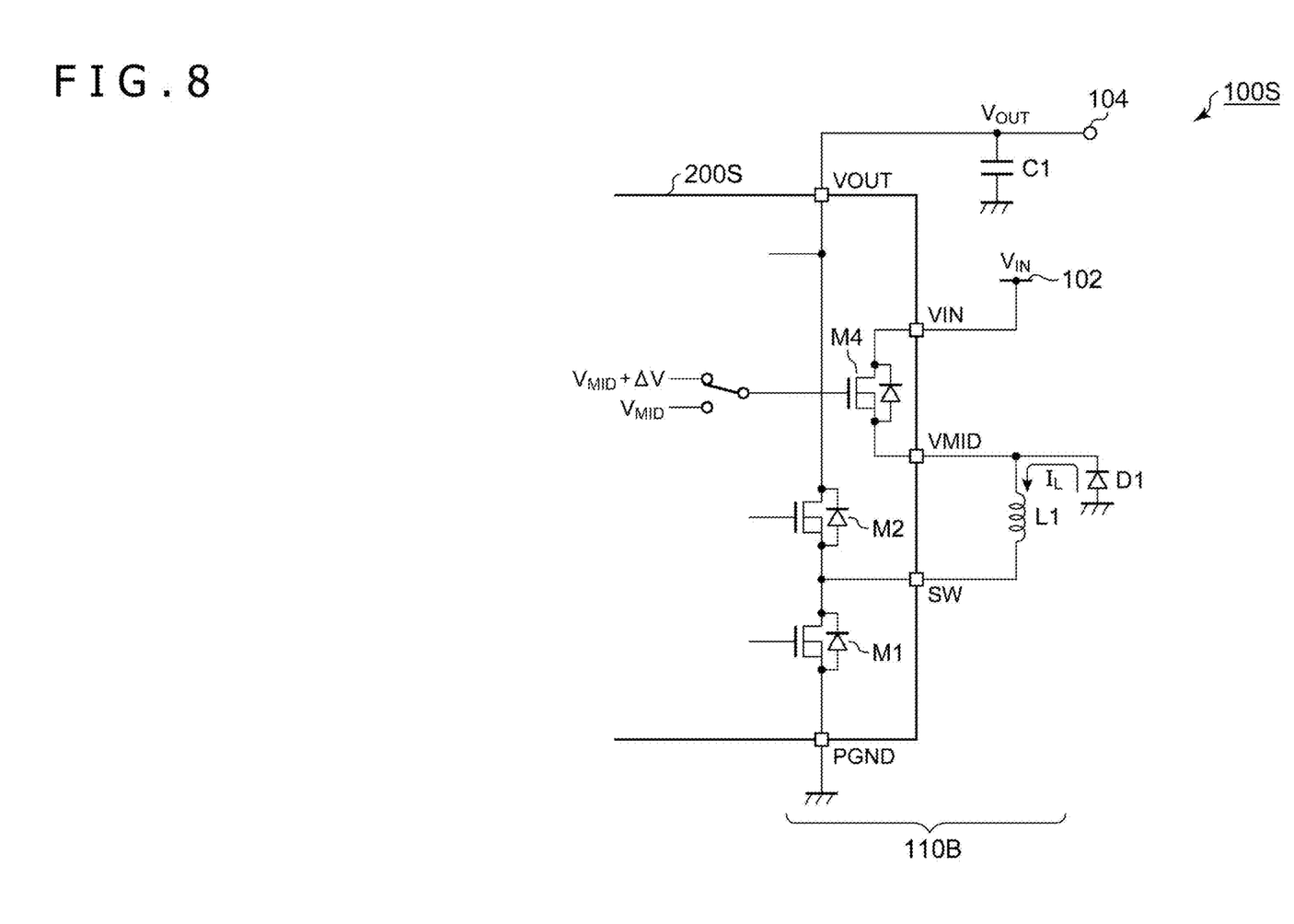
FIG. 8 is a circuit diagram of a DC/DC converter according to a comparative technique 2.

The advantages of the DC/DC converter 100B are clarified by comparison with a comparative technique 2. FIG. 8 is a circuit diagram of a DC/DC converter 100S according to the comparative technique 2. The voltage applied to the gate of the NMOS transistor M4 when the DC/DC converter 100S is stopped is different between the comparative technique 2 and the second embodiment. In the comparative technique 2, in order to immediately turn off the NMOS transistor M4, the same voltage as the source voltage $V_{MID}$ is applied to the gate in such a manner that the voltage between the gate and the source of the NMOS transistor M4 becomes zero.

In the comparative technique 2, since the NMOS transistor M4 is instantaneously turned off, the supply path of the coil current $I_L$ is cut off. As a result, there is a risk that the source (VMID pin) of the NMOS transistor M4 becomes a high impedance, the voltage thereof becomes a negative voltage, and an overvoltage is applied between the drain and the source of the NMOS transistor M4. In order to suppress the overvoltage, it is necessary to connect a diode D1 to the source of the NMOS transistor M4 and provide a supply path of a current in place of the NMOS transistor M4.

In contrast, according to the second embodiment, since the source voltage of the NMOS transistor M4 is clamped, a negative voltage is difficult to occur, the overvoltage between the drain and the source is suppressed, and reliability is improved.

Further, since the overvoltage between the drain and the source of the MMOS transistor M4 is suppressed in the second embodiment, it is not necessary to take a countermeasure for suppressing the overvoltage. That is, it is not necessary to connect the diode D1 to the source of the NMOS transistor M4. This is advantageous as compared with the comparative technique 2 in terms of cost.

Next, a concrete configuration example of the control circuit 200B will be described.

Figure 9:
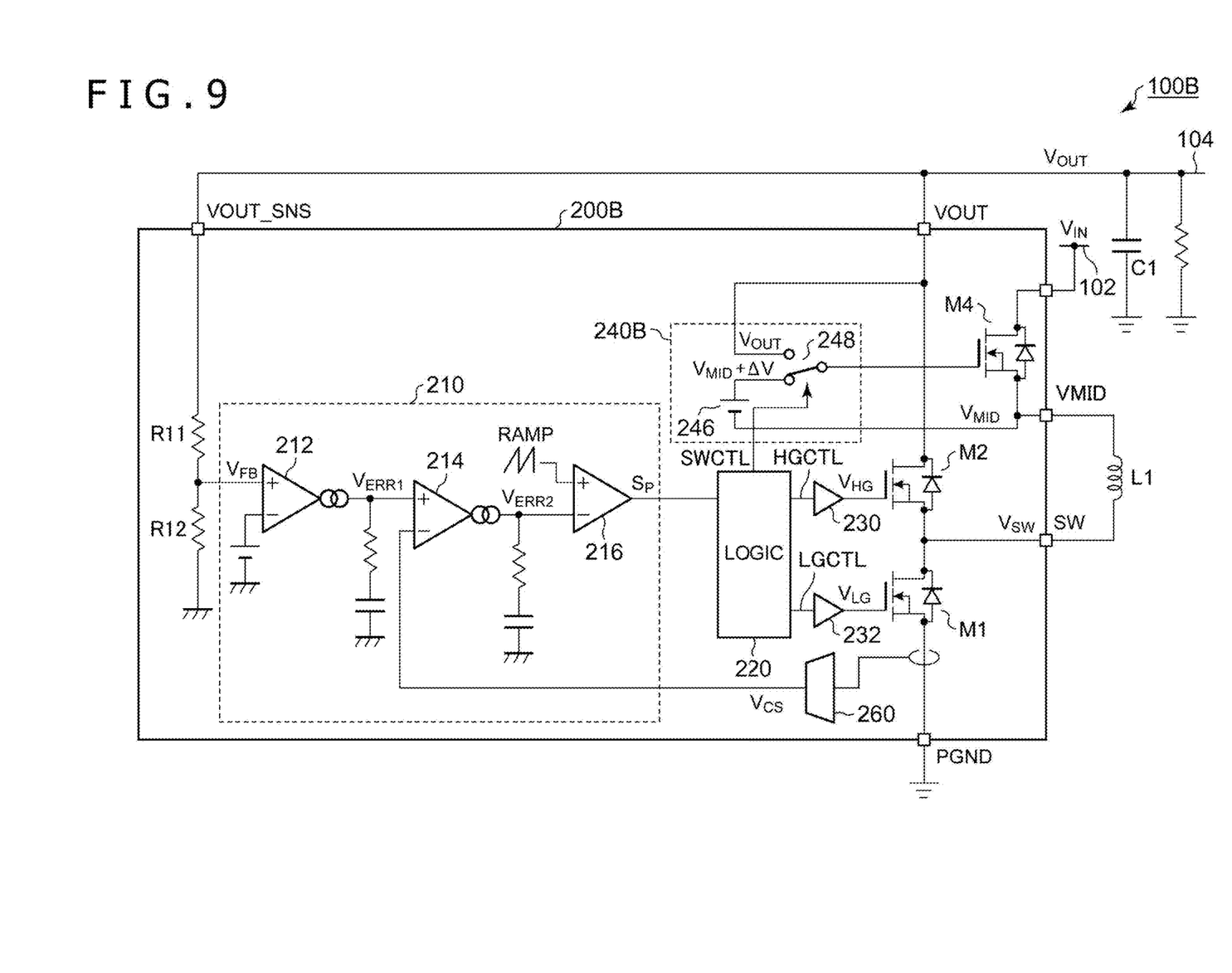
FIG. 9 is a circuit diagram of an example of a control circuit of the DC/DC converter.

FIG. 9 is a circuit diagram of an example of the control circuit 200B of the DC/DC converter. The pulse modulator 210 is similar to that of FIG. 5.

The switch driving circuit 240B includes a voltage source 246 and a selector 248. The voltage source 246 level-shifts the source voltage $V_{MID}$ of the NMOS transistor M4 to generate a voltage ($V_{MID}+\Delta V$) higher than the source voltage $V_{MID}$ by a predetermined voltage width $\Delta V$. The selector 248 selects one of the output voltage $V_{OUT}$ (=Vd) and $V_{MID}+\Delta V$ according to the switch control signal SWCTL, and supplies the selected one to the gate of the NMOS transistor M4. Specifically, the selector 248 connects the gate of the NMOS transistor M4 to the output pin VOUT when the switch control signal SWCTL is at the OFF level.

Modified Example

The embodiments described above are illustrative, and those skilled in the art can understand that various modified examples are possible for combinations of each constituent element and each processing process. Hereinafter, such modified examples will be described.

In connection with the first and second embodiments, the low-side transistor M1 and the high-side transistor M2 may be externally provided as discrete elements.

In addition, in connection with the first embodiment, the PMOS transistor M3 may be externally provided as a discrete element. In this case, a part or entirety of the switch driving circuit 240A may be configured using a discrete element outside the IC of the control circuit 200A.

In addition, in connection with the second embodiment, the NMOS transistor M4 may be externally provided as a discrete element. In this case, a part or entirety of the switch driving circuit 240B may be configured using a discrete element outside the IC of the control circuit 200B.

(Application)

Next, applications of the DC/DC converters 100A and 100B (hereinafter, simply denoted by 100) will be described.

Figure 10:
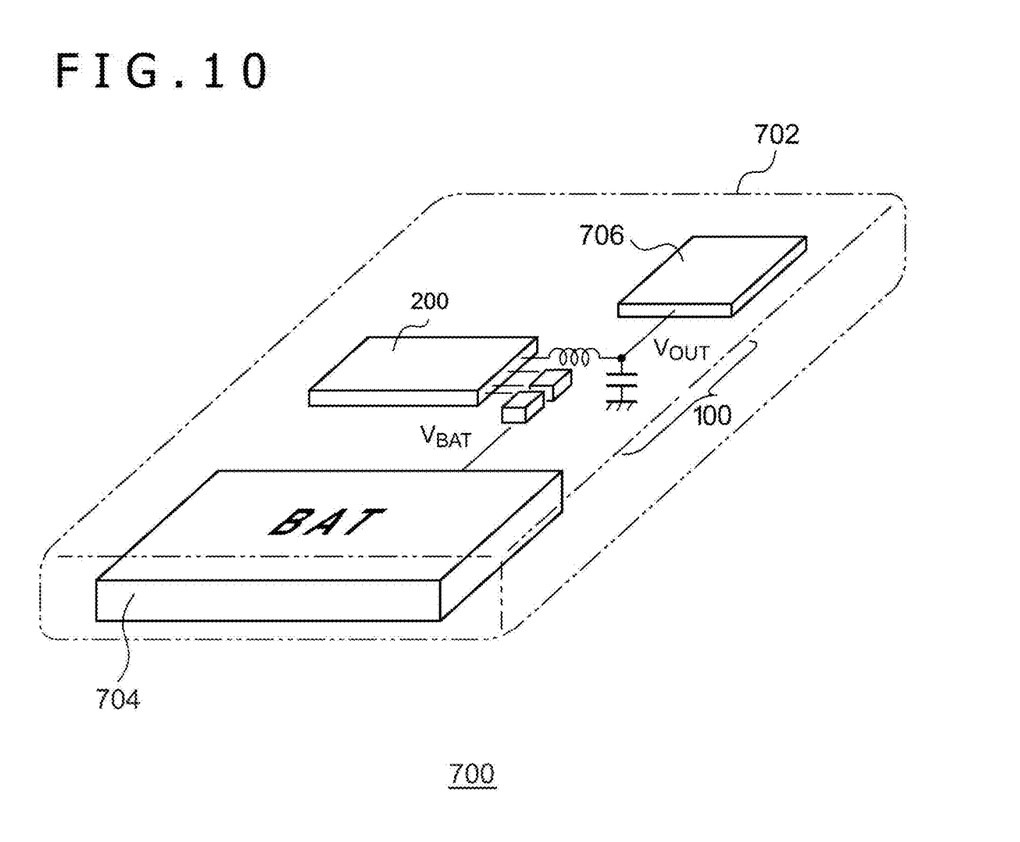
FIG. 10 is a diagram for illustrating an example of electronic equipment including the DC/DC converter according to the embodiment.

FIG. 10 is a diagram for illustrating an example of electronic equipment 700 including the DC/DC converter 100 according to the embodiment. For example, the electronic equipment 700 is a battery-driven device such as a cellular phone terminal, a digital camera, a digital video camera, a tablet terminal, or a portable audio player. The electronic equipment 700 includes a housing 702, a battery 704, a microprocessor 706, and the DC/DC converter 100. The DC/DC converter 100 receives a battery voltage $V_{BAT}$ ($=V_{IN}$) from the battery 704 at the input terminal thereof, and supplies the output voltage $V_{OUT}$ to a load connected to the output terminal.

The type of electronic equipment 700 is not limited to a battery-driven device, and may be on-vehicle equipment, office automation (OA) equipment such as a facsimile machine, or industrial equipment.

The embodiments are illustrative, and those skilled in the art can understand that various modified examples exist for combinations of each constituent element and each processing process and that such modified examples are also included in the present disclosure and may configure the scope of the present disclosure.

What is claimed is:

1. A control circuit of a boost direct current/direct current converter having a high-side transistor and a low-side transistor, the control circuit comprising:
   an input pin that receives an input voltage of the boost direct current/direct current converter;
   a pulse modulator that generates a pulse signal pulse-modulated in such a manner that output of the boost direct current/direct current converter stabilizes to a target level voltage;
   a logic circuit that generates a control signal of the high-side transistor and a control signal of the low-side transistor on a basis of the pulse signal; and
   a switch driving circuit that drives a load switch that is a P-type metal oxide semiconductor transistor connected to the high-side transistor, wherein a load is between the P-type metal oxide semiconductor transistor and the high-side transistor,
   wherein, when stopping the boost direct current/direct current converter, the switch driving circuit:
      applies a voltage corresponding to the input voltage of the boost direct current/direct current converter to a gate of the P-type metal oxide semiconductor transistor, and
      connects the gate of the P-type metal oxide semiconductor transistor to the input pin.

2. The control circuit according to claim 1,
   wherein the switch driving circuit applies an ON voltage lower than a source voltage of the P-type metal oxide semiconductor transistor by a predetermined voltage width to the gate of the P-type metal oxide semiconductor transistor in a period where the load switch is to be turned on.

3. The control circuit according to claim 1, further comprising:
   the high-side transistor;
   the low-side transistor; and
   the P-type metal oxide semiconductor transistor.

4. The control circuit according to claim 1,
wherein no pin is provided at a connection node provided between the high-side transistor and the P-type metal oxide semiconductor transistor.

5. The control circuit according to claim 1, wherein the control circuit is integrated into one semiconductor substrate.

6. A power supply circuit comprising:
a main circuit of a direct current/direct current converter; and
the control circuit according to claim 1.

7. An electronic equipment comprising:
the control circuit according to claim 1.

8. A control circuit of a boost direct current/direct current converter having a high-side transistor, a low-side transistor, and an inductor, the control circuit comprising:
an output pin to be connected to an output line of the boost direct current/direct current converter;
a pulse modulator that generates a pulse signal pulse-modulated in such a manner that output of the boost direct current/direct current converter comes stabilizes to a target level voltage;
a logic circuit that generates a control signal of the high-side transistor and a control signal of the low-side transistor on a basis of the pulse signal; and
a switch driving circuit that drives a high-side switch that is an N-type metal oxide semiconductor transistor connected to an input node, wherein the inductor of the boost direct current/direct current converter is between the N-type metal oxide semiconductor transistor and the input node,
wherein, when stopping the boost direct current/direct current converter, the switch driving circuit:
applies a voltage corresponding to an output voltage of the boost direct current/direct current converter to a gate of the N-type metal oxide semiconductor transistor, and
connects the gate of the N-type metal oxide semiconductor transistor to the output pin.

9. The control circuit according to claim 8,
wherein the switch driving circuit applies an ON voltage higher than a source voltage of the N-type metal oxide semiconductor transistor by a predetermined voltage width to the gate of the N-type metal oxide semiconductor transistor in a period where the high-side switch is to be turned on.

10. The control circuit according to claim 8, further comprising:
the high-side transistor;
the low-side transistor; and
the N-type metal oxide semiconductor transistor.

11. The control circuit according to claim 8, wherein
no diode is connected between a connection node and a ground, and
the connection node being provided between the inductor and the high-side switch.

* * * * *